(12) United States Patent
Engelsberg et al.

(10) Patent No.: US 7,263,490 B2
(45) Date of Patent: Aug. 28, 2007

(54) METHOD FOR DESCRIPTION OF AUDIO-VISUAL DATA CONTENT IN A MULTIMEDIA ENVIRONMENT

(75) Inventors: Andreas Engelsberg, Hildesheim (DE); Sven Bauer, Hildesheim (DE); Michael Wollborn, Hannover (DE); Jens Rainer Ohm, Aachen (DE)

(73) Assignee: Robert Bosch GmbH, Stuttgart (DE)

( * ) Notice: Subject to any disclaimer, the term of this patent is extended or adjusted under 35 U.S.C. 154(b) by 644 days.

(21) Appl. No.: 10/296,088

(22) PCT Filed: Apr. 5, 2001

(86) PCT No.: PCT/EP01/03882

§ 371 (c)(1),
(2), (4) Date: Apr. 29, 2003

(87) PCT Pub. No.: WO01/90931

PCT Pub. Date: Nov. 29, 2001

(65) Prior Publication Data

US 2003/0172345 A1    Sep. 11, 2003

(51) Int. Cl.
*G10L 19/00* (2006.01)
(52) U.S. Cl. .................................................. 704/500
(58) Field of Classification Search ................ 704/500
See application file for complete search history.

(56) References Cited

U.S. PATENT DOCUMENTS 6,014,642 A * 1/2000 El-Kadi et al. ............ 705/36 R
6,593,936 B1 * 7/2003 Huang et al. ............... 345/619
6,898,607 B2 * 5/2005 Rising et al. ............. 707/104.1

FOREIGN PATENT DOCUMENTS

| EP | 0 996 290 A | 4/2000 |
| WO | 99 20049 A | 4/1999 |
| WO | 01/90931 A1 | 11/2001 |

OTHER PUBLICATIONS

Wireless Application Protocol Forum: "WAP Binary XML Content Format", Approves Version 1.3, May 15, 2000, pp. 1-25.
Nack F et al: "Der Kommende Standard Zur . . . " Fernmelde-Ingenieur, Bad Winsheim, DE, pp. 1-40.
Hunter, J.: "MPEG-7 Behind the Scenes" D-LIB Magazine, Sep. 1999, Corporation OFR National Research Initiatives, USA, vol. 5, No. 9., XP002168491.
Nack F et al: "Everything You Wanted to Know . . . ", IEEE Multimedia, US, IEEE Computer Society, vol. 6, No. 3, Jul. 1999, pp. 65-77, XP 000859976.
Nack et al: "Everythin You Wanted to Know . . . ", IEEE Multimedia, IEEE Computer Society, US, vol. 6, No. 4, Oct. 1999, XP000880605.

* cited by examiner

*Primary Examiner*—Susan McFadden
(74) *Attorney, Agent, or Firm*—Michael J. Striker

(57) ABSTRACT

For the description of audio-visual data content in a multimedia environment, a binary representation of description structures is used. A binary identifier (BID) for each specified descriptor (D) and description scheme (DS) as well as a binary description definition language (DDL) represent the components. The advantages of a binary representation are a more compact encoding of description structures and thus savings in storage capacity and/or bandwidth. A faster parsing of the encoded data, especially in the context of dynamically varying descriptions, is thereby achieved.

14 Claims, 1 Drawing Sheet

METHOD FOR DESCRIPTION OF AUDIO-VISUAL DATA CONTENT IN A MULTIMEDIA ENVIRONMENT

CROSS-REFERENCE

The invention described and claimed hereinbelow is also described in PCT/EP01/03882, filed Apr. 5, 2001 and DE 00111171.5, filed May 24, 2000. This German Patent Application, whose subject matter is incorporated here by reference, provides the basis for a claim of priority of invention under 35 U.S.C. 119 (a)-(d).

BACKGROUND OF THE INVENTION

In the context of the MPEG-7 multimedia description standard description structures for the description of audio-visual data content use textual representations for descriptors and description schemes, where the number of description elements can be variable. The language elements of the so-called description definition language (DDL) which is derived from an Extensible Markup Language (XML) are represented also in textual form. The descriptor values (DVs) itself are in a binary representation.

SUMMARY OF THE INVENTION

The objective of the present invention is to reduce the required data size for storage or transmission of the descriptions and to improve the searching and browsing speed of the descriptions. This objective is achieved according to claim 1 and the subclaims by a binary representation of description structures for the description of audio-visual data content in multimedia environments. The binary description is described using the example of the MPEG-7 multimedia description standard. While to date the specified description structures are solely described in a textual form, the invention replaces the textual representation by a binary representation. The method consists of several components:

Binary identifiers for descriptors (D) and description schemes (DS)
Binary definition of dynamic description schemes (DS)
Binary definition of dynamic descriptors (D)
Binary description definition language (DDL)

Each of these components can either be used separately or in mutual combination in order to achieve the mentioned objectives.

While the textual representation provides a good readability for human beings, it is very inefficient both in terms of required data size for the coded description structures as well as for parsing the encoded data. The presented invention applies a binary representation of the description structures that requires significantly less data size for the coded description structures. Therefore, the storage capacity required for storing the encoded data or the bandwidth required for its transmission can be significantly reduced. Further, the binary representation decreases the time required for parsing the encoded data especially in the context of dynamically varying descriptions. This allows the design of much faster browsing and searching procedures for respective databases.

BRIEF DESCRIPTION OF THE DRAWINGS

Exemplifying embodiments of the invention are depicted in the drawings and will be explained in more detail in the description which follows.

DETAILED DESCRIPTION OF THE PREFERRED EMBODIMENTS

Figure 1:
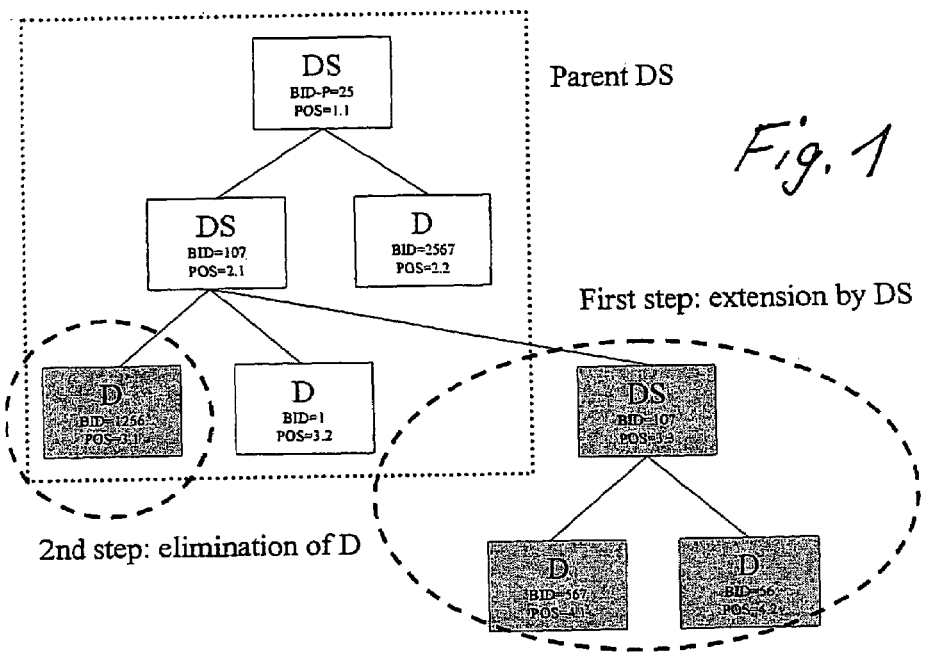
FIG. 1 shows an example for definitions of dynamic description schemes by modification of static description schemes.

Before describing the method of the invention in detail some definitions will be presented to better understand the details of the invention.

Present solutions use a textual representation of the description structures for the description of audio-visual data content in multimedia environments. For this task, a so-called description definition language (DDL) is used, which is derived from the Extensible Markup Language (XML) In the context of the remainder of this document, the following definitions are used:

Data: Data is audio-visual information that will be described using MPEG-7, regardless of storage, coding, displays transmission, medium, or technology.

Feature: A Feature is a distinctive characteristic of the data which signifies something to somebody.

Descriptor (D): A Descriptor is a representation of a Feature. A Descriptor defines the syntax and the semantics of the Feature representation.

Descriptor Values (DV): A Descriptor Value is an instantiation of a Descriptor for a given data set (or subset thereof) that describes the actual data.

Description Scheme (DS): A Description Scheme specifies the structure and semantics of the relationships between its components, which may be both Descriptors (Ds) and Description Schemes (DSs).

Description: A Description consists of a DS (structure) and the set of Descriptor Values (instantiations) that describe the Data.

Coded Description: A Coded Description is a Description that has been encoded to fulfill relevant requirements such as compression efficiency, error resilience, random access, etc.

Description Definition Language (DDL): The Description Definition Language is a language that allows the creation of new Description Schemes and, possibly, Descriptors. It also allows the extension and modification of existing Description Schemes.

Static DS: a DS that has been specified from the beginning and that is contained in a known dictionary of Ds and DSs Dynamic DS: a DS that is dynamically defined, using available static Ds and DSs The lowest level of the description is a descriptor. It defines one or more features of the data. Together with the respective DVs it is used to actually describe a specific piece of data. The next higher level is a description scheme, which contains at least two or more components and their relationships. Components can be either descriptors or description schemes. The highest level so far is the description definition language. It is used for two purposes: first, the textual representations of static descriptors and description schemes are written using the DDL. Second, the DDL can also be used to define a dynamic DS using static Ds and DSs. Finally, the DDL could possibly also be used for defining new Ds. With that respect, also for Ds the distinction between static and dynamic Ds would have to be made.

While for the DVs there is already a binary representation syntax defined, the Ds and DSs are only represented in textual form. Also, the language elements of the DDL are only represented in textual form. Below there is an example for a descriptor called "Dominant color" using the structural elements from the current DDL specification:

```
<element name="DominantColor">
    <complexType>
        <element ref="ColorSpace"/>
        <element ref="ColorQuantization"/>
        <element                          name="DomColorValues"
minOccursPar="DomColorsNumber">
            <complexType>
            <element name="ColorValue">
                <simpleType base="Int16" derivedBy="list">
                    <lengthPar value="DomColorsNumber"/>
                </simpleType>
            </element>
            <element     name="ColorVariance"     minOccurs="0"
maxOccurs="1">
                <simpleType base="unsignedInt1" derivedBy="list">
                    <lengthPar value="DomColorsNumber"/>
                </simpleType>
            </element>
            <attribute name="Percentage" type="unsignedInt5"/>
            </complexType>
        </element>
        <attribute name="DomColorsNumber" type="unsignedInt3"/>
        <attribute name="VariancePresent" type="boolean"/>
        <attribute                        name="ConfidenceMeasure"
type="unsignedInt5"/>
    </complexType>
</element>
```

For the actual instantiation of the descriptor, describing a specific piece of data, there is already a binary representation syntax defined, referred to as "binary Dv data" in the following. However, the complete description in binary form will consist of a binary header, followed by the binary DV data and that possibly followed by a binary footer.

binary header | binary DV data | binary footer

The binary header is used to define which D or DS is used to describe the data, while the binary DV data is used to represent the actual DVs. The binary footer may optionally be used to signal the end of the descriptor.

According to the invention for all representation of description structures for the description of audio-visual data content in multimedia environments a binary representation is used. The presented procedure consists of several components that are described in the following sections. The components can either be used separately or in mutual combination.

Binary Identifiers for Descriptors and Description Schemes

A binary identifier BID for each specified descriptor D and description scheme DS is the key element of the ideas which uniquely refers to a catalogue of the available descriptions. Using the BID and the binary DV representation, an exemplary structure of a D or DS could look like follows D-SC (opt) | D-DYN | BID | binary DV data | D-EC (opt)

Here, the D-SC (Startcode) and the D-EC (Endcode) can be used as an option in order to allow random access, resynchronisation etc. The D-DYN (dynamic) defines, in case of DSs up to now only, if the DS is static or dynamic. BID is the binary identifier itself, and binary DV data is the binary representation of the descriptor values. As state of the art, D-SC, D-EC, D-DYN and BID are not defined or used. The startcode and endcode should be chosen in such a way, that the occurrence of an identical bitstring in the rest of the description is not possible or at least very unlikely. D-DYN can be represented by 1 bit fixed length. Finally, for the definition of the BIDs, a unique bitstring is assigned to each D and DS. The assignment can be arbitrary or structured, as described in the following:

A) Arbitrary Assignment

A unique bitstring is assigned to each specified D and DS, while the Ds and DSs are chosen arbitrarily. Thus, it is not possible to deduct any information about the type or class of the D or DS from a subset of the bitstring. This is the most easy way of BID definition. The bitstring can either be of fixed length (option 1) or of variable length (option 2).

The respective fixed or variable length codes are generated taking into account the overall number of Ds and DSs that have to be described. As an option, some additional bitstrings can be defined as reserved in order to use them possibly for future but yet unknown purposes.

B) Structured Assignment

Here, the assignment of bitstrings to Ds and DSs is done in a structured way. This means that the BID can be separated into parts, where each part of the BID has a specific meaning. The structured BID looks as follows D-type (opt) | D-class (opt) | D-subclass (opt) | D-name The elements have the following meaning D-type: description type, i.e. either description (D) or description scheme (DS). Since there are only two possible values, this element is represented by 1 bit fixed length.

D-class: class to which the D/DS belongs, e.g. Audio, Visual, Meta-data etc. This element can either be represented as fixed length or as variable length code.

D-subclass: the subclass to which the D/DS belongs, e.g. if the class is Visual, the subclasses could be Colour, Motion, Texture etc. It is obvious that this element can only exist if the D-class element is also used. The element can either be represented as fixed length or as variable length code.

D-name: the unique name of the D/DS, i.e. the lowest level of the structure. This element is mandatory, it can either be represented as fixed length or as variable length code. Except for D-name, the elements of the structured BID are defined as optional. However, the options are partially mutually exclusive. The following combinations are allowed:

D-type | D-class | D-subclass | D-name
D-type | D-class | D-name
D-type | D-name
D-class | D-subclass | D-name
D-class | D-name As can be seen, there exist 5 possibilities to define a structured BID. The sixth possibility would be just to use D-name which is equivalent to the arbitrary BID described in (A). With the described procedure only Ds and static DSs can be described in binary form, but no dynamic DSs. A procedure for the definition of dynamic DSs is described in the next section.

Binary Definition of Dynamic Description Schemes

In order to define a dynamic DS, there exist two possibilities. The first one is to use an arbitrary set of static Ds and/or DSs and put them together forming a new, dynamic DS. The second possibility is to use a static DS as basis, and to modify it by adding new Da/DSs and/or by removing existing Ds/DSs, as well as to change the number of occurrences of Ds/DSs with the same BID at a specific level. The first possibility can only be realised using the DDL. In the following, a procedure is described which allows the binary definition of dynamic DSs for the second possibility, i.e., based on a static DS. The description in general looks as follows:

D-SC (opt) | D-DYN | BID-D | BID-P | EXT-NUM | EXT-1 | ... | EXT-N |
ELI-NUM | ELI-1 | ... | ELI-M | binary DV data | D-EC (opt)

The elements D-SC, D-DYN, binary DV data and D-EC have already been described in the previous section. The additional elements have the following meaning:

- BID-D: dynamic BID, i.e. the BID of the dynamic DS to be defined. It can be arbitrarily chosen or can be defined in a structured way as described in the previous section. However, the BID-D is dynamically generated and its full meaning is thus only known to the application that defined it.
- BID-P: parent BID, i.e. the BID of the static DS which serves as a basis for the definition of the DS to be defined. This BID must be taken from the set of available static DSs and its meaning is known to all applications.
- EXT-NUM: number of extensions, i.e. the number of Ds/DSs that are added to the parent DS.
- EXT-1 . . . EXT-M: description of the extensions; the detailed syntax is described below.
- ELI-NUM: number of eliminations, i.e. the number of Ds/DSs that are removed from the parent DS.
- ELI-1 . . . ELI-N: description of the eliminations; the detailed syntax is described below, The elements EXT-NUM and ELI-NUM can be represented by fixed or variable length code. The extensions EXT-m and the eliminations ELI-n are realised as follows:

A) Definition of Extensions EXT-m

The syntax for the extensions is defined as follows:
POS-P | BID | OCC-NUM
Here, the elements are defined as follows:
- POS-P: the position of the parent node, i.e. the "address" in the bitstring where the extension should be placed. This can be realised in two ways: first, the bitstream for a description is extended by an element that defines a unique position, i.e. "D-SC | POS-ID | . . . ". By this, each D/DS in a description can be uniquely referenced. Second, the address is represented implicitly by either counting the number of bits from the D-SC of the parent DS until the D/DS to be referenced, or by a 2D address specifying the hierarchy level on which the DS can be found and, within the level, specifying the serial number of the D/DS to be referenced.
- BID: the BID of the D/DS that is added to the parent DS at POS-P.
- OCC-NUM: number of occurrences of the D/DS to be added to the parent node at POS-P.

B) Definition of Eliminations ELI-n

The syntax for the eliminations is defined as follows:
POS-ELI | OCC-NUM (opt)
Here, the elements are defined as follows:
- POS-ELI: the position of the D/DS that is eliminated from the parent DS. The position can again be specified in the two ways described above for POS-P.
- OCC-NUM: number of occurrences of the D/DS to be removed from the parent node at POS-P. This parameter is optional and is only applied for such Ds/DSs that can occur more than once in a static DS.

An example for applying both kinds of modification for the definition of dynamic DSs is given in FIG. 1. In the example, a binary tree representation is used for visualisation of the DSs. In FIG. 1 the parent DS is modified by adding an additional descriptor scheme DS (step 1) and by removing a descriptor D (step 2).

In the given example, first DS 107 is added in DS 25 at parent node position 2.1. This includes the static Ds with BIDs 567 and 56, which are known as normative parts of DS 107. The new, dynamic DS is then assigned by the BID-D 1345:

D-DYN=1 | BID-D=1345 | BID-P=25 | EXT-NUM=1 | POS-P=2.1 | D-type=DS | D-name=107 | OCC-NUM=1 | ELI-NUM=0 | binary DV data In the second step, the D at position 3.1 (BID=1256) is eliminated and replaced by a "NULL" node (this still has the same position ID, but no content). The advantage of not only eliminating a D/S, but replacing it by a null node, is that the position IDs of the remaining nodes remain unchanged. The modified DS gets ID 1346:

D-DYN=1 | BID-D=1346 | BID-P=25 | EXT-NUM=0 | ELI-NUM=1 | POS-ELI=3.1 | binary DV data The first and the second step can also be performed simultaneously. In the given example, the POS codes for the hierarchical structures consist of values <level.number>, where level=1 is the top level. Since the number of sub-description elements for each DS is known, the number index can also be generated automatically. If multiple description elements with same ID can occur (maxoccurs>1 in DDL expression), the POS code should be expressed as <level.number.occurence>. Such a procedure has the advantage that POS values always remain unchanged as compared to the parent DS, numbers for new elements start always with max_number+1, where max_number is the highest number previously existing at a specific level. If a reduction at a higher level occurs, all underlying nodes are also eliminated.

The dynamically allocated BID-D is not normative, but only for proprietary use.

Binary Definition of Dynamic Descriptors

Up to now, only normative D elements could be used. In the following, a binary syntax is specified that enables user-defined D nodes, which can consist of e.g. private data (carrying description elements outside the scope of MPEG-7), or specify the semantics of a D by a feature extraction method.

D-SC (opt) | D-DYN | BID-D | DATA-TYPE | DATA-LENGTH | D-DATA | binary DV data | D-EC (opt)

The elements D-SC, D-DYN, binary DV data and D-EC have already been described in sections 2.4.1 and 2.4.2. The additional elements have the following meaning:
- DATA-TYPE: type of data that defines the dynamic descriptor. Here, e.g. private data or the semantic of a feature extraction method can be contained.
- DATA-LENGTH: length of the data that defines the descriptor.
- DATA: the actual data that defines the descriptor.

The elements can be realised using either fixed length or variable length codes.

Binary Description Definition Language

This is intended as a one-to-one mapping of description structures defined in XML/DDL (or similar languages) from normative, pre-specified sub-elements. The purpose is to express DSs which are built from scratch in an efficient way by using the "catalogue" of unique binary identifiers. The syntax to define new DSs with the binary DDL is as follows:

BID-D | NOB | BID1 | B-FLAG | NOB-BID1(opt) | BID11 | B-FLAG | NOB-BID11 (opt) | BID12 | B-FLAG | NOB-BID12 (opt) . . . BID1N | B-FLAG | NOB-BID1N (opt) | BID2 | B-FLAG | NOB-BID2 (opt) . . . BIDN | B-FLAG | NOB-BIDN (opt)

Here, the elements are defined as follows:

BID-D: the temporary BID of the dynamically defined DS (dynamic BID).

B-FLAG: indicates, if "1", that the preceding DS has one or more children Ds or DSs, the number of which is specified in the following element. If "0" it indicates that the DS has no further children. The element B-FLAG is only used if the preceding BID describes a DS; in case of the BID describing a D, the element is not necessary, since Ds can have no further children.

NOB: number of branches, i.e. the number of children Ds or DSs the dynamic DS shows in a binary tree representation at the first level.

BID1: the BID of the first static D or DS (from the unique normative catalogue) in the first level.

NOB-BID1: the static DS with BID1 can have several children Ds or DSs, the number of which is specified here.

BID11: the BID of the first static D or DS in the second level with respect to the DS with BID1.

NOB-BID11: the static DS BID11 can have several children, the number of which is specified here BID12: the BID of the second static D or DS in the second level with respect to the DS with BID1.

NOB-BID12: the static DS BID12 can have several children, the number of which is specified here.

BID1N: the BID of the Nth static D or DS in the second level with respect to the DS with BID1.

NOB-BID1N: the static DS BID1N can have several children, the number of which is specified here.

BID2: the BID of the second static D or DS (from the unique normative catalogue) in the first level.

OB-BID2: the static DS with BID2 can have several children Ds or DSs, the number of which is specified here.

BIDN: the BID of the Nth static D or DS (from the unique normative catalogue) in the first level.

NOB-BID2: the static DS with BIDN can have several children Ds or DSs, the number of which is specified here.

Figure 2:
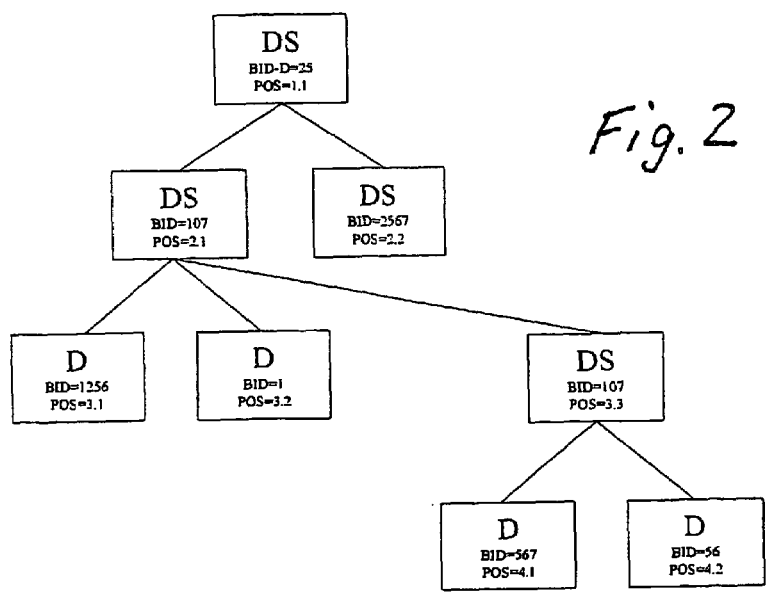
FIG. 2 shows an example for a new defined (dynamic) description scheme using binary DLL.

The defined elements can either be represented using a fixed length or a variable length code. Since the syntax given above is an optional recursive one, it shall be described using the example shown in FIG. 2.

Using the above defined binary syntax, the example can be described as follows:

BID-D=25 | NOB-2 | BID1=107 | B-FLAG=1 | NOB-BID1=3 | BID11=1256 | BID12=1 | BID13=107 | B-FLAG=1 | NOB-BID13=2 | BID131=567 | NOB-BID131=0 | BID132=56 | BID2=2567|BID-FLAG=0

The syntax can also be described using a different representation as shown below. Here, each line corresponds to one element of the binary representation, where for better understanding, the corresponding positions from FIG. 2 and the type of the description (D or DS) are included as comments ("/*").

| | |
|---|---|
| BID-D=25 | /* POS=1.1, DS |
| NOB=2 | |
|   BID1=107 | /* POS=2.1, DS |
|   BID-FLAG=1 | |
|   NOB-BID1=3 | |
|     BID11=1256 | /* POS=3.1, D |
|     BID12=1 | /* POS=3.2, D |
|     BID13=107 | /* POS=3.3, DS |
|     BID-FLAG=1 | |
|     NOB-BID13=2 | |
|       BID=567 | /* POS=4.1, D |
|       BID=56 | /* POS=4.2, D |
|   BID2=2567 | /* POS=2.2, DS |
|   BID-FLAG=0 | |

The invention claimed is:

1. A method for reducing a required data size for storage and transmission of an XML-based description of audio-visual multimedia data content in a multi-media environment, comprising:
   inputting a textual XML representation;
   providing a binary identifier (BID) for each specified descriptor (D) and description scheme (DS) contained in a known dictionary, wherein said descriptor (D) is a representation of a feature for a distinctive characteristic of data and wherein said description scheme (DS) specifies the structure and semantics of the relationships between its components, being descriptors (D) and/or description schemes (DS);
   providing a binary description definition language (DDL);
   applying the binary identifier (BID) to the textual XML representation;
   using an MEPG-7 multimedia description standard for the binary description of the audio-visual multimedia data content in the multimedia environment; and
   generating a resulting binary description of the audio-visual multimedia data content, such that the resulting generated data content has a reduced size for improved storage and transmission relative to the XML textual representation.

2. The method according to claim 1, comprising using a hierarchical description with the lowest level of description being a descriptor (D), the next higher level being the description scheme (DS) and a further higher level being the description definition language (DDL).

3. The method according to claim 1, further comprising assigning a unique bitstring to each specified descriptor (D) and description scheme (DS).

4. The method according to claim 3, wherein the bitstring is of fixed or variable length.

5. The method according to claim 1, further comprising structuring the binary identifiers (BID) in several parts, where each part has a specific meaning such as type, class, subclass or name.

6. The method according to claim 1, comprising dynamic description schemes, where an arbitrary set of static descriptor (D) and/or description schemes (DS) are put together forming a dynamic description scheme (DS).

7. The method according to claim 1, comprising dynamic description schemes by using a static descriptor (D) as a basis and to modify this descriptor by adding new descriptor- or description scheme information and/or by removing existing descriptor- or description scheme information.

8. The method according to claim 1, comprising the position of parent nodes (POS-P) defining an address in the bitstring where an extension is placed.

9. The method according to claim 8, comprising an element that defines a unique position for an extension.

10. The method according to claim 8, comprising that the address is represented implicitly by either counting the number of bits from a startcode (D-SC) of the parent description scheme (DS) until the descriptor (D) or description scheme (DS) to be referenced or by a two dimensional address specifying the hierarchical level on which the description scheme (DS) can be found and within the level, specifying the serial number of the descriptor or the description scheme to be referenced.

11. The method according to claim 9, comprising that a position element (POS-ELI) is provided, marking the position of the descriptor (D) or description scheme (DS) to be eliminated from a parent description scheme (DS).

12. The method according to claim 11, comprising that in case of an elimination the bitstring in this position is replaced by a null node, so that position identifications of remaining nodes remain unchanged.

13. The method according to claim 1, comprising providing user defined descriptor nodes, carrying description elements especially outside the scope of MPEG-7.

14. The method according to claim 1, comprising that the binary description language (DDL) is provided to define new description schemes (OS) and especially describing the number of branches (NOB . . . ) on different description levels.

* * * * *